(12) United States Patent
Chaubey et al.

(10) Patent No.: US 11,620,688 B2
(45) Date of Patent: Apr. 4, 2023

(54) METHODS AND SYSTEMS FOR DYNAMICALLY DETERMINING AND ADAPTING TO COST IMPACT DURING A FLIGHT

(71) Applicant: Honeywell International Inc., Charlotte, NC (US)

(72) Inventors: Rajesh Chaubey, Karnataka (IN); Srihari Jayathirtha, Karnataka (IN); Ivan Markov, Sofia (BG); Chavdar Kirov, Sofia (BG)

(73) Assignee: Honeywell International Inc., Charlotte, NC (US)

( * ) Notice: Subject to any disclaimer, the term of this patent is extended or adjusted under 35 U.S.C. 154(b) by 120 days.

(21) Appl. No.: 17/303,747

(22) Filed: Jun. 7, 2021

(65) Prior Publication Data

US 2021/0295397 A1 Sep. 23, 2021

Related U.S. Application Data

(63) Continuation of application No. 16/233,893, filed on Dec. 27, 2018, now Pat. No. 11,030,664.

(51) Int. Cl.
*G06Q 30/02* (2012.01)
*G06Q 30/0283* (2023.01)
*G08G 5/00* (2006.01)

(52) U.S. Cl.
CPC ....... *G06Q 30/0283* (2013.01); *G08G 5/0039* (2013.01)

(58) Field of Classification Search
CPC .. G06Q 30/0283; G06Q 10/04; G08G 5/0039; G08G 5/0021; G08G 5/0052
See application file for complete search history.

(56) References Cited

U.S. PATENT DOCUMENTS

| 8,234,068 B1 * | 7/2012 | Young ................. G08G 5/0034 701/410 |
| 8,565,938 B2 | 10/2013 | Coulmeau et al. |
| 9,269,205 B1 | 2/2016 | Lamkin et al. |

(Continued)

FOREIGN PATENT DOCUMENTS

| EP | 3154047 A1 | 4/2017 |
| EP | 3346431 A1 | 7/2018 |
| EP | 3404592 A1 | 11/2018 |

*Primary Examiner* — Richard M Camby
(74) *Attorney, Agent, or Firm* — Bookoff McAndrews PLLC

(57) ABSTRACT

A method for providing cost data for a flight is provided. The method (i) obtains cost target data for the flight, under anticipated conditions; (ii) obtains real-time aircraft performance parameters affecting the actual cost of the flight, using continuous monitoring during the flight, including at least aircraft speed modes, aircraft flight level changes, tactical interventions, weather impact, and descent timing deviations; (iii) determines an actual cost of the flight, based on the real-time aircraft performance parameters affecting the actual cost; (iv) identifies flight plan change options associated with a potential cost savings over the actual cost, wherein the flight plan change options comprise potential modifications to the flight plan to complete the flight; (v) presents the flight plan change options; and (vi) adapts operation of one or more avionics systems onboard the aircraft, based on one of the flight plan change options.

20 Claims, 8 Drawing Sheets

(56) References Cited

U.S. PATENT DOCUMENTS

| | | | |
|---|---|---|---|
| 9,330,573 B2 | 5/2016 | Brandao et al. | |
| 9,963,247 B2 | 5/2018 | Boyer et al. | |
| 10,665,114 B2* | 5/2020 | Irrgang | G08G 5/0056 |
| 2002/0193920 A1* | 12/2002 | Miller | G05B 23/0245 |
| | | | 701/9 |
| 2005/0143871 A1* | 6/2005 | Boorman | G08G 5/0052 |
| | | | 701/3 |
| 2006/0085164 A1* | 4/2006 | Leyton | G01W 1/10 |
| | | | 702/179 |
| 2006/0089920 A1* | 4/2006 | Ramesh | G06Q 30/02 |
| | | | 705/400 |
| 2007/0179703 A1 | 8/2007 | Soussiel et al. | |
| 2007/0219679 A1 | 9/2007 | Coulmeau | |
| 2011/0022404 A1 | 1/2011 | Peterson | |
| 2013/0226373 A1 | 8/2013 | Bollapragada et al. | |
| 2014/0257598 A1 | 9/2014 | Bailey et al. | |
| 2015/0371544 A1* | 12/2015 | Mere | G08G 5/0039 |
| | | | 701/3 |

* cited by examiner

METHODS AND SYSTEMS FOR DYNAMICALLY DETERMINING AND ADAPTING TO COST IMPACT DURING A FLIGHT

CROSS-REFERENCE TO RELATED APPLICATION(S)

This patent application is a continuation of and claims the benefit of priority to U.S. Nonprovisional patent application Ser. No. 16/233,893, filed on Dec. 27, 2018, the entirety of which is incorporated herein by reference.

TECHNICAL FIELD

Embodiments of the subject matter described herein relate generally to generating cost data for a flight plan. More particularly, embodiments of the subject matter relate to performing real-time modeling of cost data for a flight plan to identify flight plan variations that may be used to obtain cost savings including recovery of unexpected costs.

BACKGROUND

A primary goal of commercial airlines, and non-commercial aircraft operators, is to operate an aircraft from an origin location to a destination location as safely as possible and at the lowest cost. Such operations may include scheduled and unscheduled flights for an airline, business jet operations, rotary wing aircraft operations (e.g., helicopter operations), unmanned aerial vehicles (UAVs), and the like. Day-to-day operational costs and revenues for aircraft can vary due to fuel-related cost variations, time-related cost variations, delay costs, load factor costs, and the like. In the case of commercial airlines, air route profitability may be analyzed by continuously determining whether a specific flight sector is profitable during a given time period, and air route profitability analysis produces metrics that may be used to determine whether to alter, supplement, or exclude routes from an airline schedule. Cost control analysis usually provides recommended target operational costs for a given flight sector. For all types of aircraft operations, including non-commercial applications, profitability may be increased by identifying and taking advantage of cost control opportunities to optimize revenue. Deviations from target operational costs may occur during flight, due to internal and external factors that can increase the overall cost of the flight.

Accordingly, it is desirable to provide opportunities to adhere to target operational costs to optimize revenue. Furthermore, other desirable features and characteristics will become apparent from the subsequent detailed description and the appended claims, taken in conjunction with the accompanying drawings and the foregoing technical field and background.

BRIEF SUMMARY

Some embodiments of the present disclosure provide a method for providing cost data for a flight associated with a flight plan, by a computing device onboard an aircraft, the computing device comprising at least one processor and a system memory element. The method (i) obtains cost target data for the first execution of the flight, wherein the cost target data includes a predetermined cost index for the flight plan under anticipated conditions, and wherein the cost target data includes a cost target for the flight; (ii) obtains real-time aircraft performance parameters affecting the actual cost of the flight, using continuous monitoring during the flight, wherein the real-time aircraft performance parameters include at least aircraft speed modes used during the first execution, aircraft flight level changes implemented during the first execution, tactical interventions performed during the first execution, weather impact for the first execution, and descent timing deviations during the first execution; (iii) determines an actual cost of the first execution of the flight, based on the real-time aircraft performance parameters affecting the actual cost; (iv) identifies flight plan change options associated with a potential cost savings over the actual cost, by the at least one processor, wherein the flight plan change options comprise potential modifications to the flight plan to complete the flight; (v) presents the flight plan change options, via a display device communicatively coupled to the at least one processor; and (vi) adapts operation of one or more avionics systems onboard the aircraft, by the at least one processor, based on one of the flight plan change options.

Some embodiments of the present disclosure provide a computing device onboard an aircraft, the computing device for providing cost data for a flight associated with a flight plan. The computing device includes: a system memory element; a display device, configured to present graphical elements and text associated with the cost data for the flight associated with the flight plan; and at least one processor communicatively coupled to the system memory element and the display device, the at least one processor configured to: obtain cost target data for the first execution of the flight, wherein the cost target data includes a predetermined cost index for the flight plan under anticipated conditions, and wherein the cost target data includes the cost target; obtain real-time aircraft performance parameters affecting the actual cost of the flight, using continuous monitoring during the flight, wherein the real-time aircraft performance parameters include at least aircraft speed modes used during the first execution, aircraft flight level changes implemented during the first execution, tactical interventions performed during the first execution, weather impact for the first execution, and descent timing deviations during the first execution; determine the actual cost of the first execution of the flight, based on the real-time aircraft performance parameters affecting the actual cost; identify flight plan change options associated with a potential cost savings over the actual cost, wherein the flight plan change options comprise potential modifications to the flight plan to complete the flight; present the flight plan change options, via the display device; and adapt operation of one or more avionics systems onboard the aircraft, based on one of the flight plan change options.

Some embodiments of the present disclosure provide a non-transitory, computer-readable medium containing instructions thereon, which, when executed by a processor, perform a method for providing cost data for a flight associated with a flight plan, by a computing device onboard an aircraft. The computing device comprises the processor and a system memory element. The method creates a real-time model of the flight plan, by the processor, based on real-time aircraft performance parameters affecting an actual cost of a first execution of the flight; determines the actual cost of the first execution of the flight, by the processor, based on the real-time model of the flight plan; and when the actual cost of the first execution of the flight exceeds a cost target for the first execution of the flight, dynamically and continuously during the flight, the method; identifies flight plan change options to potentially recover a cost difference between the cost target and the actual cost, based on the real-time model, by the processor, wherein the flight plan change options comprise potential modifications to the flight plan to complete the flight; presents the flight plan change options, via a display device communicatively coupled to the processor; and adapts operation of one or more avionics systems onboard the aircraft, by the processor, based on one of the flight plan change options.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1:
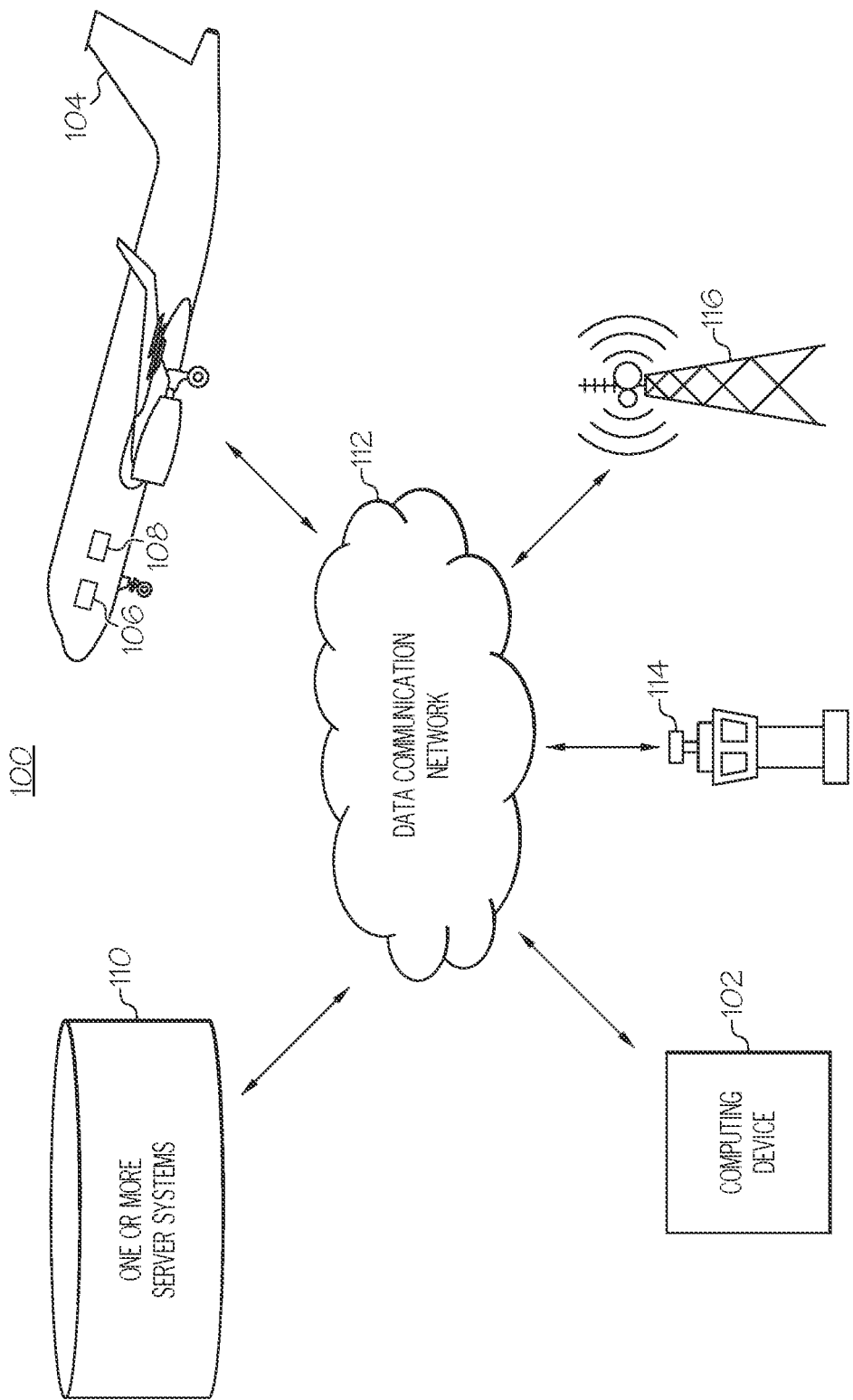
FIG. 1 is a diagram of a system for providing real-time cost data and options for cost savings, in accordance with the disclosed embodiments.

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

The subject matter presented herein relates to systems and methods for dynamically monitoring the actual cost data for a particular flight and providing alternative flight plan options for cost savings, to include cost recovery, when the actual cost exceeds cost projections for the flight. More specifically, the subject matter relates to using current and historic aircraft parameter data, and current and historic flight cost data, to dynamically create and update an analytical model of the flight and costs associated with the flight, in real-time during the flight. The real-time model is then used to continuously calculate (i) the cost of the current flight when flown according to the current flight plan, and (ii) costs associated with potential modifications to the current flight plan. Also contemplated herein is the identification and presentation of cost savings options during flight, the cost savings options including a subset of the potential modifications costing less than the current flight when flown according to the current flight plan.

Certain terminologies are used with regard to the various embodiments of the present disclosure. A flight is an aircraft-based trip from an origin or departure location to a destination location. An intended flight extends from an origin location (e.g., a departure airport) at the beginning point of the trip to a destination location (e.g., an arrival airport) at the endpoint of the trip. The trip is composed of one or more "legs", wherein each leg is a subset of the trip and extends between stopover airports. A flight plan includes details associated with an intended flight and is usually filed with an aviation authority (e.g., Federal Aviation Administration (FAA)) prior to departure. A flight plan indicates a planned route or flight path of the aircraft, and generally includes: departure and arrival location points, an estimated time en route between the departure and arrival location points, alternate stopover and/or arrival airports in case of bad weather, a type of flight (e.g., instrument flight rules (IFR), visual flight rules (VFR)), pilot data, number of people onboard the aircraft, and aircraft data.

The cost target is the anticipated cost of the flight from an origin point to a destination point. The cost target is generally a predetermined and realistic anticipated value that is based on historic cost data and current flight conditions. The cost target may be a cost estimate that is used as a goal or objective to be achieved during execution of the flight, in order to keep the flight costs within an acceptable range of costs for the flight. An actual cost for a flight is a continuously updated measure of the monetary requirements to execute the flight. The actual cost varies based on aircraft performance parameters, and is continuously updated during flight, based on the real-time model. Flight cost savings may be obtained by modifying the current flight plan to incorporate lower-cost alternative options to continue the flight from the original departure location to the original arrival location. Flight cost savings may be sought and obtained in order to reduce the actual cost of the flight, in situations when the actual cost exceeds a cost target for the flight and in situations where the actual cost does not exceed the cost target for the flight. Flight cost recovery is a way to recoup some of the actual cost of the flight by implementing and using a flight cost savings option (i.e., a lower-cost alternative flight plan option) to continue the flight from the original departure location to the original arrival location.

A flight plan change option is an identified modification to the flight plan that permits the aircraft to complete execution of the flight from the original departure location to the original arrival location. A flight plan change option is generally associated with a lower cost than the actual cost to execute the flight according to the current flight plan, and thus provides an opportunity for cost savings and/or cost recovery. Flight plan change options are presented as a plurality of potential user-selectable changes from which a user may select to alter a current flight plan to achieve the cost recovery. When a first flight plan change option costs less than the original cost target for the flight, then the first flight plan change option indicates a cost savings and potentially a cost recovery. In scenarios where the actual cost of the flight does not exceed the cost target for the flight, the flight crew may select a flight plan change option that is lower than planned flight costs to take advantage of the unexpected cost savings. In scenarios where the actual cost of the flight does exceed the cost target for the flight, the flight crew may select a flight plan change option that is lower than planned flight costs to recover some of the cost for the flight.

Turning now to the figures, FIG. 1 is a diagram of a system 100 for providing real-time cost data and options for cost recovery, in accordance with the disclosed embodiments. The system 100 operates to compute and present dynamic, real-time, cost savings options, onboard an aircraft 104 during flight. In circumstances where an actual cost of a current flight exceeds planned cost targets, then the system 100 operates to compute and present dynamic, real-time, cost recovery options, onboard the aircraft 104 during flight. The system 100 may include, without limitation, a computing device 102 that communicates with one or more avionics systems 106, including at least a Flight Management System (FMS) 108, onboard the aircraft 104 and one or more server systems 110, via a data communication network 112. In practice, certain embodiments of the system 100 may include additional or alternative elements and components, as desired for the particular application.

The computing device 102 may be implemented by any computing device that includes at least one processor, some form of memory hardware, a user interface, and communication hardware. For example, the computing device 102 may be implemented using a personal computing device, such as a tablet computer, a laptop computer, a personal digital assistant (PDA), a smartphone, or the like. In this scenario, the computing device 102 is capable of storing, maintaining, and executing an Electronic Flight Bag (EFB) application configured to determine and present flight modeling data, flight cost data (e.g., actual cost data, cost projection data, cost target data), and flight plan change options. In other embodiments, the computing device 102 may be implemented using a computer system onboard, and integrated into, the aircraft 104, wherein the computing device 102 is configured to determine and present flight modeling data, flight cost data, and flight plan change options.

The aircraft 104 may be any aviation vehicle for which flight cost modeling and flight cost recovery options are relevant and applicable during completion of a flight route. The aircraft 104 may be implemented as an airplane, helicopter, spacecraft, hovercraft, or the like. The one or more avionics systems 106 include the FMS 108, and may also include Automatic Dependent Surveillance-Broadcast (ADS-B) devices, navigation devices, weather radar, brake systems, or the like. Data obtained from the one or more avionics systems 106 and the FMS 108 may include, without limitation: flight data, weather data, brake system data, weight and balance data, runway analysis data, aircraft performance data, or the like.

The air traffic control (ATC) 114 may be an air traffic control station or any other ground-based location from which personnel communicate with the aircraft 104, including the ground-based personnel and equipment concerned with monitoring and controlling air traffic within a particular area. The ATC 114 functions to communicate with the aircraft 104 to facilitate cost recovery, including receiving clearance requests from the aircraft 104 for user-selected flight plan change options, and communicating approval or denial to the aircraft 104 for a received clearance request. The ATC 114 is also representative of a flight operation control ground station, and may provide other communications to the aircraft 104, including but not limited to: historic flight route performance data, cost parameter data, terminal area broadcast data, air traffic control broadcast data, current and historic weather data, current and historic NOTAM data, and the like.

In certain embodiments, the aircraft 104 and/or the computing device 102 receives all of the data from the ATC 114 (or other ground control station), the data being used to compute flight change options for cost recovery during a flight. In this scenario, the ATC 114 or other ground control station may receive data from other sources (e.g., the one or more server systems 110, airline data management, historic flight route data sources, weather data sources, NOTAM data sources, terminal area broadcast sources, or the like). However, in other embodiments, the aircraft 104 and/or the computing device 102 communicates directly with external sources to obtain the data being used to compute flight change options for cost recovery during a flight, including: (i) the one or more server systems 110 (e.g., third party services providing weather data and NOTAM data, airline data management, historic route and aircraft route performance databases), (ii) the Traffic Information Service-Broadcast (TIS-B) 116, (iii) the ATC 114, and any other source of data applicable to compute flight change options for cost recovery during a flight.

The one or more server systems 110 may include any number of application servers, and each server may be implemented using any suitable computer. In some embodiments, the one or more server systems 110 includes one or more dedicated computers. In some embodiments, the one or more server systems 110 includes one or more computers carrying out other functionality in addition to server operations. The one or more server systems 110 may store and provide any type of data used to compute flight plan alternatives for fuel cost recovery when the actual cost of a flight exceeds a cost target for the flight. Such data may include, without limitation: flight plan data, air traffic control broadcast data, terminal area broadcast data, third-party services data (e.g., weather data, Notices to Airmen (NOTAM) data, historic flight route data, historic aircraft performance data, airline data management data, flight cost parameter data, cost deviation parameter data, aircraft performance and operational capability data, and other data compatible with the computing device 102.

The computing device 102 is located onboard the aircraft 104, and the computing device 102 communicates with the one or more avionics systems 106 via wired and/or wireless communication connection. The computing device 102 and each of the one or more server systems 110, the air traffic control 114, and the TIS-B 116, are generally disparately located, and the computing device 102 communicates with each of the one or more server systems 110, the air traffic control 114, and the TIS-B 116, via the data communication network 112 and/or via other communication mechanisms onboard the aircraft 104. The data communication network 112 may be any digital or other communications network capable of transmitting messages or data between devices, systems, or components. In certain embodiments, the data communication network 112 includes a packet switched network that facilitates packet-based data communication, addressing, and data routing. The packet switched network could be, for example, a wide area network, the Internet, or the like. In various embodiments, the data communication network 112 includes any number of public or private data connections, links or network connections supporting any number of communications protocols. The data communication network 112 may include the Internet, for example, or any other network based upon TCP/IP or other conventional protocols. In various embodiments, the data communication network 112 could also incorporate a wireless and/or wired telephone network, such as a cellular communications network for communicating with mobile phones, personal digital assistants, and/or the like. The data communication network 112 may also incorporate any sort of wireless or wired local and/or personal area networks, such as one or more IEEE 802.3, IEEE 802.16, and/or IEEE 802.11 networks, and/or networks that implement a short range (e.g., Bluetooth) protocol. For the sake of brevity, conventional techniques related to data transmission, signaling, network control, and other functional aspects of the systems (and the individual operating components of the systems) may not be described in detail herein.

During typical operation, the computing device 102 obtains relevant data associated with a particular flight, including anticipated conditions for the particular flight and a cost target for the particular flight, from air traffic control 114, TIS-B 116, and the one or more server systems 110. During flight onboard the aircraft 104, the computing device 102 continuously and dynamically obtains aircraft parameter data from the plurality of avionics systems 106 and the FMS 108, and creates a real-time model for the flight to perform analysis of actual fuel costs. The computing device 102 uses the real-time model and the obtained relevant data, during the flight, to identify changes that can potentially be made to the flight plan to obtain cost savings for the flight. In some embodiments, the computing device 102 uses the real-time model and the obtained relevant data, during the flight, to determine whether an actual cost for the flight (which is updated in real-time) is projected to exceed the cost target, and to identify changes that can potentially be made to the flight plan to recover some of the costs exceeding the cost target. The computing device 102 presents the potential flight plan changes (i.e., flight plan change options) for flight crew viewing and selection. The computing device 102 is further configured to receive a user input selection and upload, link, or otherwise transmit the user-selected flight plan change option to the FMS 108, thereby initiating action by the FMS 108 to alter the flight plan according to the user selection for cost recovery. Additionally, the computing device 102 is configured to continuously and dynamically obtain real-time aircraft parameters, and to update the real-time model continuously throughout the flight. Such dynamic, real-time obtained aircraft parameters considers aircraft parameters that are updated in real-time, which may alter previously-calculated flight plan change options at any point while the aircraft is traveling during the flight (e.g., recommendations calculated prior to the flight).

Figure 2:
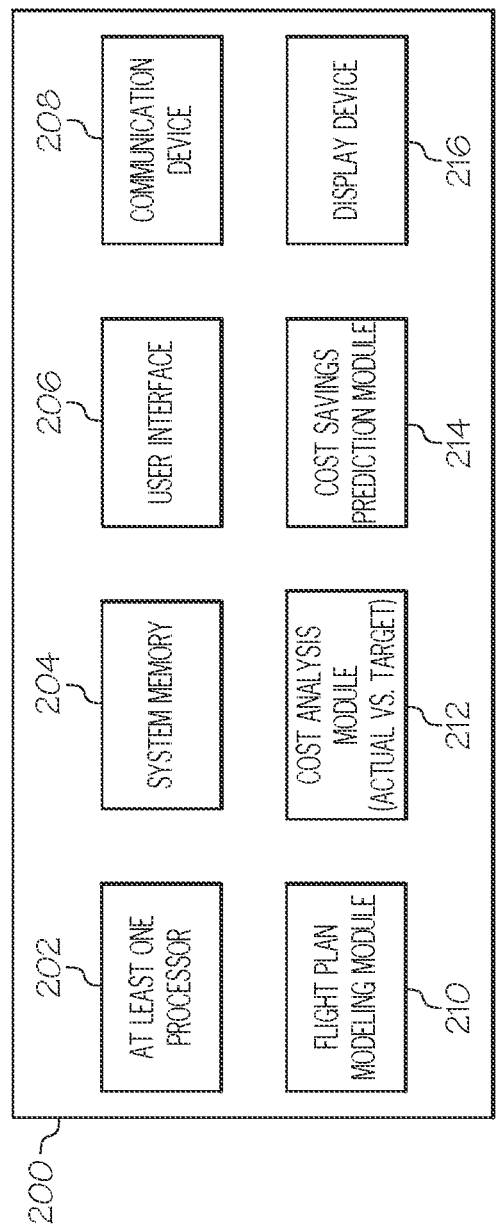
FIG. 2 is a functional block diagram of a computing device used as part of a system for providing real-time cost data and options for cost savings, in accordance with the disclosed embodiments.

FIG. 2 is a functional block diagram of a computing device 200 used as part of a system for providing real-time cost data and options for cost savings, in accordance with the disclosed embodiments. It should be noted that the computing device 200 can be implemented with the computing device 102 depicted in FIG. 1. In this regard, the computing device 200 shows certain elements and components of the computing device 102 in more detail. The computing device 200 generally includes, without limitation: at least one processor 202; system memory 204; a user interface 206; a communication device 208; a flight plan modeling module 210; a cost analysis module 212; a cost savings prediction module 214; and a display device 216. These elements and features of the computing device 200 may be operatively associated with one another, coupled to one another, or otherwise configured to cooperate with one another as needed to support the desired functionality—in particular, continuously and dynamically updating a real-time model of a flight, during the flight, and providing potential flight change options for cost savings and cost recovery during the flight, as described herein. For ease of illustration and clarity, the various physical, electrical, and logical couplings and interconnections for these elements and features are not depicted in FIG. 2. Moreover, it should be appreciated that embodiments of the computing device 200 will include other elements, modules, and features that cooperate to support the desired functionality. For simplicity, FIG. 2 only depicts certain elements that relate to the identification of flight change options for cost recovery techniques described in more detail below.

The at least one processor 202 may be implemented or performed with one or more general purpose processors, a content addressable memory, a digital signal processor, an application specific integrated circuit, a field programmable gate array, any suitable programmable logic device, discrete gate or transistor logic, discrete hardware components, or any combination designed to perform the functions described here. In particular, the at least one processor 202 may be realized as one or more microprocessors, controllers, microcontrollers, or state machines. Moreover, the at least one processor 202 may be implemented as a combination of computing devices, e.g., a combination of digital signal processors and microprocessors, a plurality of microprocessors, one or more microprocessors in conjunction with a digital signal processor core, or any other such configuration.

The at least one processor 202 is communicatively coupled to the system memory 204. The system memory 204 is configured to store any obtained or generated data associated with real-time modeling of a particular flight for a particular aircraft, associated cost target data and actual cost data, and user-selectable options for changing the flight plan for cost savings and cost recovery purposes, and graphical elements associated with real-time modeling and cost savings. The system memory 204 may be realized using any number of devices, components, or modules, as appropriate to the embodiment. Moreover, the computing device 200 could include system memory 204 integrated therein and/or a system memory 204 operatively coupled thereto, as appropriate to the particular embodiment. In practice, the system memory 204 could be realized as RAM memory, flash memory, EPROM memory, EEPROM memory, registers, a hard disk, a removable disk, or any other form of storage medium known in the art. In certain embodiments, the system memory 204 includes a hard disk, which may also be used to support functions of the computing device 200. The system memory 204 can be coupled to the at least one processor 202 such that the at least one processor 202 can read information from, and write information to, the system memory 204. In the alternative, the system memory 204 may be integral to the at least one processor 202. As an example, the at least one processor 202 and the system memory 204 may reside in a suitably designed application-specific integrated circuit (ASIC).

The user interface 206 may include or cooperate with various features to allow a user to interact with the computing device 200. Accordingly, the user interface 206 may include various human-to-machine interfaces, e.g., a keypad, keys, a keyboard, buttons, switches, knobs, a touchpad, a joystick, a pointing device, a virtual writing tablet, a touch screen, a microphone, or any device, component, or function that enables the user to select options, input information, or otherwise control the operation of the computing device 200. For example, the user interface 206 could be manipulated by an operator to select a presented flight change option for upload into a Flight Management System (FMS) onboard an aircraft, such that the flight change option might be implemented for cost savings purposes, as described herein. In certain embodiments, the user interface 206 may include or cooperate with various features to allow a user to interact with the computing device 200 via graphical elements rendered on a display element (e.g., the display device 216). Accordingly, the user interface 206 may initiate the creation, maintenance, and presentation of a graphical user interface (GUI). In certain embodiments, the display device 216 implements touch-sensitive technology for purposes of interacting with the GUI. Thus, a user can manipulate the GUI by moving a cursor symbol rendered on the display device 216, or by physically interacting with the display device 216 itself for recognition and interpretation, via the user interface 206.

The communication device 208 is suitably configured to transmit signals from the computing device 200, and to receive data transmissions from: one or more remote servers (see reference 110, FIG. 1); one or more avionics systems onboard an aircraft (see reference 106, FIG. 1); one or more broadcast transmission sources (see reference 116, FIG. 1); one or more air traffic control centers and/or ground control operations centers (see reference 114, FIG. 1); or the like. The communication device 208 may transmit and receive communications over a wireless local area network (WLAN), the Internet, a satellite uplink/downlink, a cellular network, a broadband network, a wide area network, or the like. In some embodiments, the communication device 208 is representative of the wired/wireless communication hardware described previously, and is also representative of an aircraft onboard transponder, such as an Automatic Dependent Surveillance-Broadcast (ADS-B) device that is configured to receive broadcast communications from other aircraft, air traffic control, a Terminal Information Service-Broadcast (TIS-B) data provider, or the like. The communication device 208 is compatible with communication protocol described previously (see reference 112, FIG. 1), and may leverage conventional design concepts that need not be described in detail here.

As described in more detail below, data received by the communication device 208 may include, without limitation: flight plan data, flight plan data, air traffic control broadcast data, terminal area broadcast data, third-party services data (e.g., weather data, Notices to Airmen (NOTAM) data, historic flight route data, historic aircraft performance data, airline data management data, flight cost parameter data, cost deviation parameter data, aircraft performance and operational capability data, and other data compatible with the computing device 200. Data provided by the communication device 208 may include, without limitation: user selections of flight plan change options, air traffic control (ATC) clearance requests, flight crew acknowledgment communications, and the like.

The flight plan modeling module 210 is configured to create a real-time model of a particular flight under anticipated conditions. The real-time model provides flight data analysis and cost data analysis used to determine an actual cost of the current flight based on anticipated conditions (e.g., weather data, NOTAM data), historic route data, historic aircraft parameter data from one or more avionics systems onboard the aircraft, and historic cost data associated with the route for the flight. To create and update the real-time model, the flight plan modeling module 210 incorporates cost target data for a particular execution of the flight, aircraft performance parameters including aircraft speed modes used during execution of the flight, aircraft flight level changes performed during execution of the flight, tactical interventions performed during execution of the flight, weather impact of the execution of the flight, and descent timing deviations occurring during execution of the flight. The flight plan modeling module 210 continuously and dynamically updates the real-time model throughout the flight, in real-time, based on new and updated current aircraft performance parameters and flight conditions data.

The cost analysis module 212 is configured to continuously monitor the real-time model (created, updated, and maintained by the flight plan modeling module 210) to obtain an updated actual cost continuously throughout execution of the flight. Executing the flight is the aircraft action of flying from the departure location to a planned arrival location. The cost analysis module 212 uses the real-time model to assess flight conditions and aircraft parameters that can change during the course of executing the flight, to update the actual cost based on the changing flight conditions and aircraft parameters, and to use the continuously updated actual cost data to determine when the actual cost of executing the flight exceeds the predetermined cost target for the flight.

The cost savings prediction module 214 is configured to use the real-time model (created, updated, and maintained by the flight plan modeling module 210) to identify and present optional changes to the flight plan that, if implemented, would decrease the cost of executing the flight. The cost analysis prediction module 214 identifies potential changes to the flight plan that permit completion of the flight from the original departure location to the original arrival location, and predicts a cost associated with each of the potential changes, using the real-time model. The cost associated with each flight plan change option may be higher or lower than the originally projected cost target for the flight. A cost target for the flight is a planned and budgeted monetary price to fly the aircraft from the departure location to the arrival location. In other words, the cost target is the anticipated cost of the flight from an origin point to a destination point. When a first flight plan change option costs less than the original cost target for the flight, then the first flight plan change option indicates a cost savings or a cost recovery. The flight crew may select a flight plan change option that is lower than planned flight costs to lower and/or recover some of the cost for the flight.

In practice, the flight plan modeling module 210, the cost analysis module 212, and/or the cost savings prediction module 214 may be implemented with (or cooperate with) the at least one processor 202 to perform at least some of the functions and operations described in more detail herein. In this regard, the flight plan modeling module 210, the cost analysis module 212, and/or the cost savings prediction module 214 may be realized as suitably written processing logic, application program code, or the like.

The display device 216 is configured to display various icons, text, and/or graphical elements associated with real-time modeling of a flight and potential modifications to a current flight plan to achieve cost savings or cost recovery for the flight (i.e., flight plan change options). In an exemplary embodiment, the display device 216 is communicatively coupled to the user interface 206 and the at least one processor 202. The at least one processor 202, the user interface 206, and the display device 216 are cooperatively configured to display, render, or otherwise convey one or more graphical representations or images associated with real-time modeling of a flight and flight plan change options on the display device 216, as described in greater detail below. In an exemplary embodiment, the display device 216 is realized as an electronic display configured to graphically display real-time modeling data, cost data, and flight plan change options, as described herein. In some embodiments, the computing device 200 is an integrated computer system onboard an aircraft, and the display device 216 is located within a cockpit of the aircraft, and is thus implemented as an aircraft display. In other embodiments, the display device 216 is implemented as a display screen of a standalone, personal computing device (e.g., laptop computer, tablet computer). It will be appreciated that although the display device 216 may be implemented using a single display, certain embodiments may use additional displays (i.e., a plurality of displays) to accomplish the functionality of the display device 216 described herein.

Figure 3:
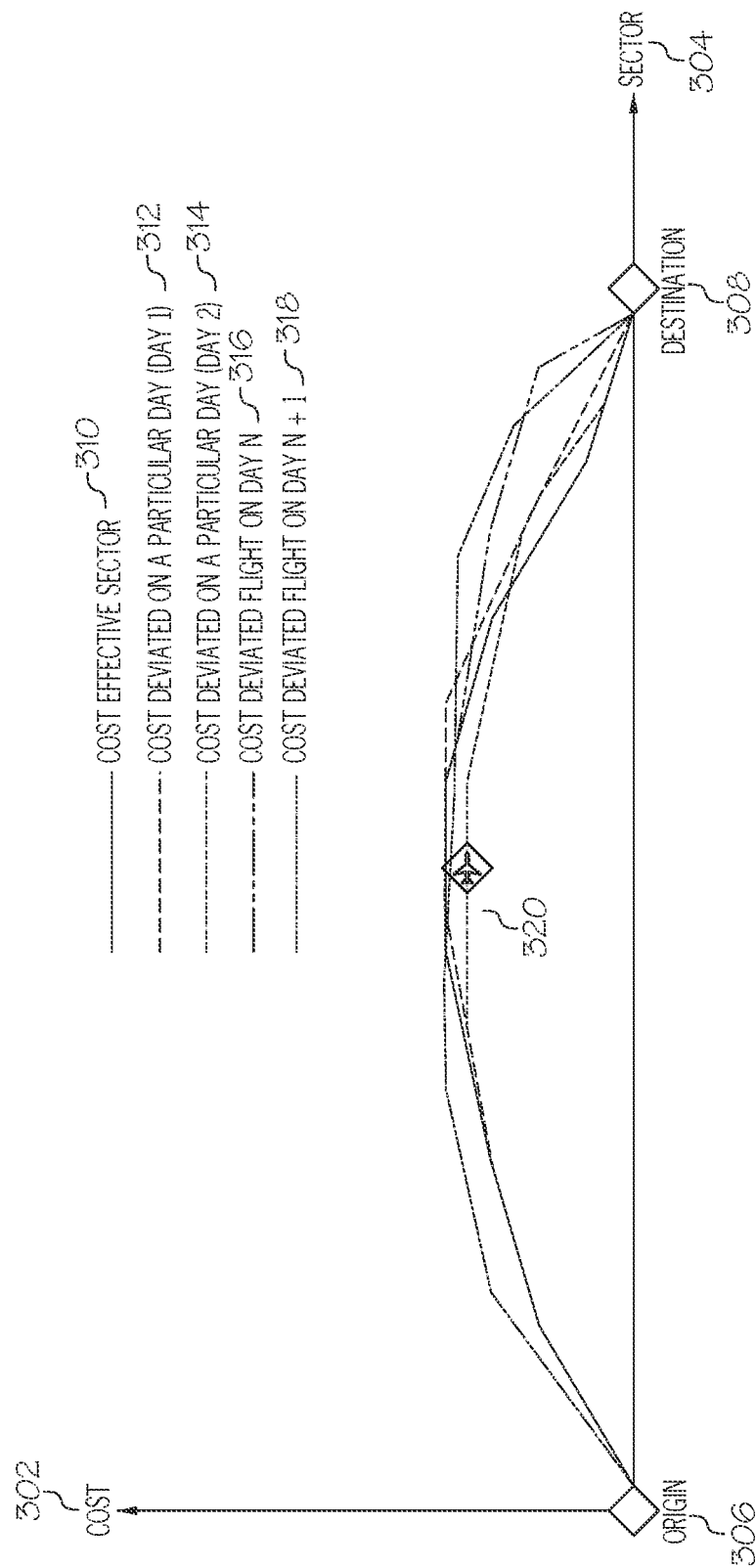
FIG. 3 is a diagram of a plot that illustrates model for projected cost deviations for a particular flight, in accordance with the disclosed embodiments.

FIG. 3 is a diagram of a plot 300 that illustrates a model for projected cost deviations for a particular flight from an origin location to a destination location. The plot 300 illustrates the effect that inconsistencies in, and changes to, aircraft performance parameters and external flight conditions on multiple executions of the same flight, when cost savings and cost recovery are not considered or accommodated during an execution of the flight. In the scenario of FIG. 3, an aircraft 320 executing the particular flight from the origin 306 to the destination 308 lacks a cost target for the flight, cost deviation and cost adherence information for the flight, historic data associated with performance of the flight route with respect to potential delays, and route profitability data for the sector during flight. The lack of cost target data, cost deviation data, cost adherence data, historic performance data, and route profitability data causes the aircraft 320 to continue a cost-deviated flight until landing at the planned destination 308 location.

The plot 300 is a graph of a cost 302 for a flight between an origin 306 and a destination 308 of a flight sector 304. The plot 300 depicts: a cost effective sector 310, according to historic flight performance data and historic cost data for the flight (e.g., a flight operational record); a cost deviated flight executed on a first day 312; a cost deviated flight executed on a subsequent day 314; a cost deviated flight executed on Day N 316; and a cost deviated flight executed on Day (N+1) 318.

As shown, the cost effective sector 310 describes an execution of the flight according to a cost target, as defined by historic cost data for previous executions of the flight, found in a flight operational record. Here, the cost effective sector 310 is a plot of the cost 302 of the flight when the flight is executed in an ideal, cost effective manner. The cost effective sector 310 is the cost target for the flight between an origin 306 and a destination 308 of a flight sector 304. The cost deviated flight executed on a first day 312 is a plot of the cost 302 of the flight when the flight is executed on a first day, without access to the previously described cost data (e.g., cost target data, cost deviation data, cost adherence data, historic performance data, flight route profitability data). During certain segments of the cost deviated flight executed on a first day 312, the cost deviated flight adheres to the cost effective sector 310 by maintaining the same cost 302 as the cost effective sector 302 during that particular segment of the cost deviated flight executed on a first day 312. However, during other segments of the cost deviated flight executed on a first day 312, the cost deviated flight deviates from the cost effective sector 310 when the cost 302 is higher or lower than the cost effective sector 302 for the same particular segment of the cost deviated flight executed on a first day 312. Thus, the cost deviated flight executed on a first day 312, as shown, presents both cost adherences to, and cost deviations from, the cost target defined by the cost effective sector 310. The cost deviated flight executed on a subsequent day 314 is a plot of the cost 302 of the flight when the flight is executed on a day subsequent to the first day (see reference 312). The cost deviated flight executed on Day N 316 is a plot of the cost 302 of the flight when the flight is executed on another day subsequent to the first two modeled flight costs (e.g., the a cost deviated flight executed on a first day 312 and the cost deviated flight executed on a subsequent day 314). Similar to the cost deviated flight executed on a first day 312, the cost deviated flight executed on a subsequent day 314 and the cost deviated flight executed on Day N 316, as shown, present cost adherences to, and cost deviations from, the cost target defined by the cost effective sector 310.

As illustrated in the plot 300 of FIG. 3, the flight crew onboard the aircraft 320 does not have access to the cost data, and the flight crew is therefore unable to make decisions to modify, operations of the aircraft 320 to achieve a lower actual cost for the flight, and thus to bring the cost of any of the cost deviated flights 312, 314, 316, 318 closer to the cost target illustrated by the cost effective sector 310. As shown, the cost deviated flight executed on a first day 312 includes small deviations in cost 302 from the cost effective sector 310; the cost deviated flight executed on a subsequent day 314 includes deviations in cost 302 that exceed the deviations in cost 302 of the cost deviated flight executed on a first day 312; the cost deviated flight executed on Day N 316 includes deviations in cost 302 that exceed the deviations in cost 302 of the cost deviated flight executed on a first day 312 and of the cost deviated flight executed on a subsequent day 314; and the cost deviated flight executed on Day (N+1) 318 is a plot of the cost 302 of the flight when the flight is executed when cost parameters deviate the most from the cost target (e.g., the cost effective sector 310).

In the scenario illustrated in FIG. 3, the aircraft 320 is flying (i.e., executing) the cost deviated flight executed on a subsequent day 314. Without access to cost target data, cost deviation data, historic performance data, or route profitability data, the flight crew of the aircraft 320 is unaware of how to execute the flight in a cost effective way, over the same sector for which the flight was previously executed in a cost effective way (e.g., the cost effective sector 310). When the flight crew does not have knowledge of "sector performance" during execution of the flight, it is difficult for the flight crew to modify performance and operational capabilities of the aircraft to achieve cost savings and/or cost recovery. It is thus critical that flight crews are made aware of cost saving potential, and provided a mechanism to detect cost parameter changes and evaluate savings and cost recovery options for a current execution of the flight. When the flight crew is aware of the aforementioned parameters, the flight crew can better manage fuel consumption, emission targets, and cost targets during operations, and airlines can better manage maximizing airline route profitability.

Figure 4:
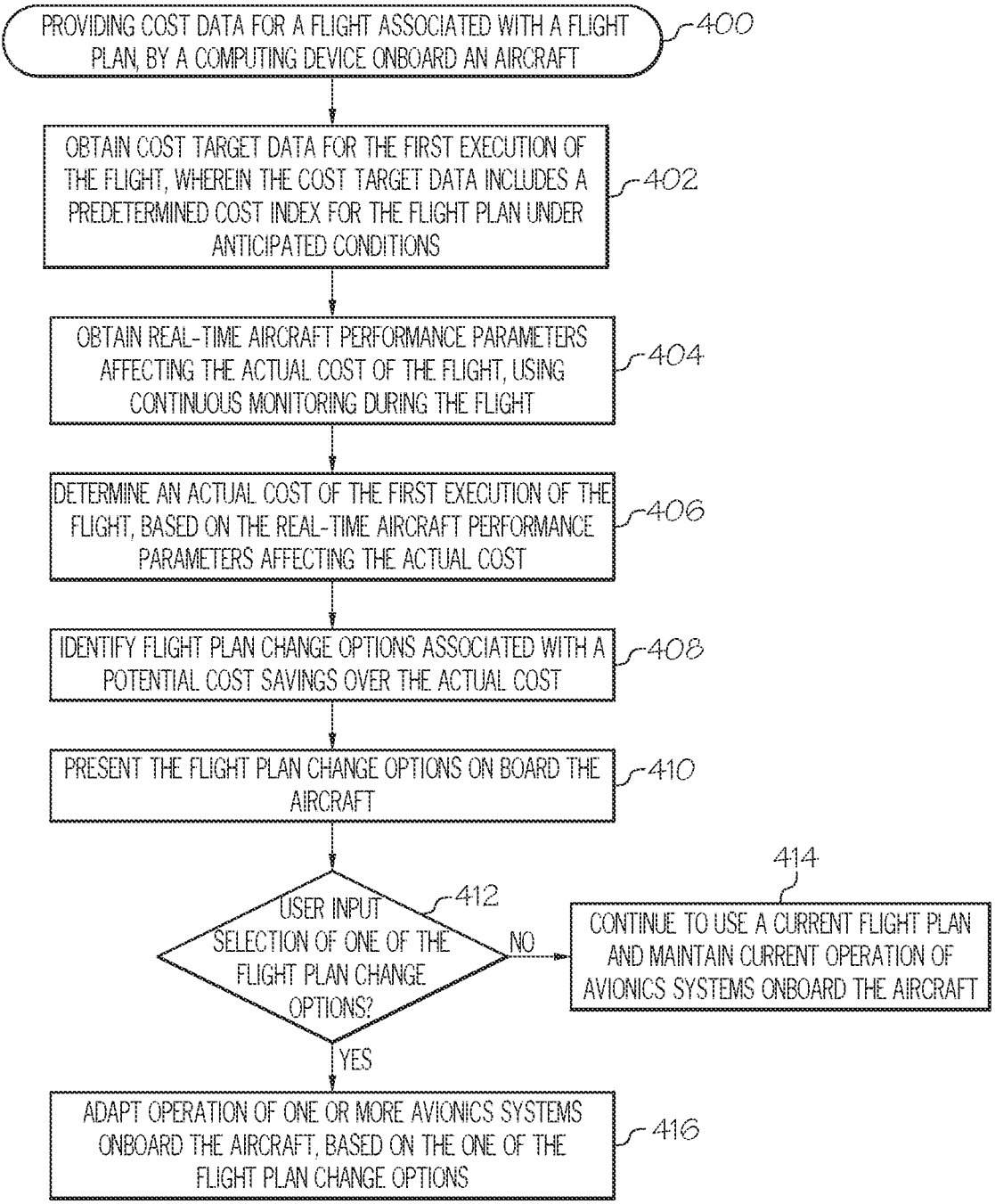
FIG. 4 is a flow chart that illustrates an embodiment of a process for providing cost data for a flight associated with a flight plan, by a computing device onboard an aircraft, in accordance with the disclosed embodiments.

FIG. 4 is a flow chart that illustrates an embodiment of a process 400 for providing cost data for a flight associated with a flight plan, by a computing device onboard an aircraft, in accordance with the disclosed embodiments. First, the process 400 obtains cost target data for the first execution of the flight, wherein the cost target data includes a predetermined cost index for the flight (using the current flight plan) under anticipated conditions (step 402). The flight is an aircraft-based trip from an origin or departure location to a destination location, and the flight plan indicates a planned route or flight path of the aircraft, and generally includes: departure and arrival location points, an estimated time en route between the departure and arrival location points, alternate stopover and/or arrival airports in case of bad weather, a type of flight (e.g., instrument flight rules (IFR), visual flight rules (VFR)), pilot data, number of people onboard the aircraft, and aircraft data. Cost target data includes the anticipated cost of the flight from the origin point (i.e., departure location) to a destination point (i.e., arrival location). The anticipated cost of the flight (i.e., the predetermined cost index) is based on historical flight performance data, and was described previously with regard to FIG. 3, reference 310. Anticipated conditions affecting a projected cost of a flight may include weather conditions, wind conditions, pressure conditions, a physical condition of the aircraft, anticipated total aircraft weight, and any other quantifiable condition affecting flight performance of the aircraft and, as a result, affecting the cost of executing a particular flight.

The process 400 then obtains real-time aircraft performance parameters affecting the actual cost of the flight, using continuous monitoring during the flight (step 404). The real-time aircraft performance parameters may include, without limitation: aircraft speed modes used during the first execution, aircraft flight level changes implemented during the first execution, tactical interventions performed during the first execution, weather impact for the first execution, descent timing deviations during the first execution, and/or any other factor, parameter, or condition occurring internally to the aircraft or externally to the aircraft, which may affect an actual cost of executing the flight.

The process 400 also determines an actual cost of the first execution of the flight, based on the real-time aircraft performance parameters affecting the actual cost (step 406). An actual cost for a flight is a continuously updated measure of the monetary requirements to execute the flight. The actual cost varies based on aircraft performance parameters, and is continuously updated during flight, based on the real-time model. After determining the actual cost of the first execution of the flight (step 406), the process 400 identifies flight plan change options associated with a potential cost savings over the actual cost (step 408), and presents the flight plan change options onboard the aircraft (step 410), such that the flight crew is aware of the identified potential flight plan change options. One suitable methodology for identifying flight plan change options (step 408) is described below with reference to FIG. 6, and one suitable methodology for presenting the flight plan change options (step 410) is described below with reference to FIG. 8. Here, the process 400 the actual flight costs incurred thus far during the flight trigger an analysis of the flight plan and the identification of potential modifications to the flight plan to prevent incurring, and therefore save, at least a portion of the identified actual cost. In other words, the flight plan change options (i.e., the modifications to the flight plan) cost less than the actual cost of executing the current flight plan as-is and without changes. Flight cost savings options are ways to avoid incurring some of the actual cost of the flight by modifying the current flight plan to incorporate lower-cost alternative options to continue the flight from the original departure location to the original arrival location.

The process 400 presents the flight plan change options onboard the aircraft (step 410) to elicit user input selections of one of the flight plan change options for implementation onboard the aircraft to alter the current flight. When the process 400 does not receive a user input selection of one of the flight plan change options (the "No" branch of 412), then the process 400 continues to use a current flight plan and maintain current operation of avionics systems onboard the aircraft (step 414). Here, the process 400 determines that the user did not provide a user selection to modify the current flight plan, and thus, the user prefers to continue use of the current flight plan for this particular flight.

When the process 400 receives a user input selection of one of the flight plan change options (the "Yes" branch of 412), then the process 400 adapts operation of one or more avionics systems onboard the aircraft, based on the one of the flight plan change options (step 416) that has been selected by the user. Here, one of the flight plan change options is designated for implementation, via a user input selection. However, in some embodiments (not shown), the one of the flight plan options is designated for implementation via an automatic analysis and selection performed by the process 400. For example, the process 400 may identify and select the lowest-cost option of a plurality of flight plan change options. As another example, the process 400 may identify and select a flight plan change option that includes the lowest quantity of required pilot actions. As a third example, the process 400 may automatically select a flight plan change option associated with a cost that is lower than a predefined threshold, or associated with a cost savings or cost recovery amount that is above a predefined threshold. In other embodiments, the process 400 may present a plurality of flight plan change options meeting predefined cost criteria, receive a user input selection of one of the flight plan change options, and adapt operation of one or more avionics systems onboard the aircraft to accommodate the user input selection.

After the user-selected flight plan change option is received (the "Yes" branch of 412) or the one of the flight plan options is designated for implementation via an automatic analysis and selection performed by the process 400, the process 400 adapts the one or more avionics systems (step 416) to accommodate the applicable flight plan change option by implementing the flight change option. At minimum, the process 400 provides the flight plan change option to a Flight Management System (FMS) onboard the aircraft, such that the FMS can modify the flight plan and communicate appropriate parameters and settings to other avionics systems, to accommodate the applicable flight plan change option. Here, the process 400 uploads the one of the flight plan change options into a Flight Management System (FMS) onboard the aircraft, to change the flight plan; changes the flight plan based on the one of the flight plan change options, via the FMS, to create a changed flight plan; and generates a lateral trajectory and a vertical trajectory for the changed flight plan, via the FMS, wherein adapting the operation of the one or more avionics systems comprises changing the flight plan and generating the lateral trajectory and the vertical trajectory.

Certain embodiments of the process 400 are applicable to a subset of cost savings options applicable to cost recovery for the flight. In this scenario, the process 400 determines whether the actual cost of a first execution of the flight exceeds a cost target for the flight. The actual cost of the first execution of the flight is a real-time measurement of the cost of the flight, which is dynamically adjusted in real-time to reflect a current, updated, and therefore accurate, actual cost of the flight. The cost target, in contrast, is the predetermined and planned assertion of a likely cost of the flight from the origin location to the destination location. The cost target is a goal or objective for the flight crew to attempt to achieve, in an effort to keep flight costs within reasonable limits. Thus, when the process 400 determines that the actual cost of a first execution of the flight does not exceed the cost target, the process 400 continues to use a current flight plan and maintain current operation of avionics systems onboard the aircraft (as in step 414). Here, the process 400 determines that the actual flight costs incurred thus far during the flight are within an acceptable cost range for this particular flight. However, when the process 400 determines that the actual cost of a first execution of the flight exceeds a cost target, then the process 400 identifies the flight plan change options (step 408) to not only provide a cost savings over the actual cost of the flight, but also to potentially recover a cost difference between the cost target and the actual cost, and then presents the flight plan change options onboard the aircraft (step 410), such that the flight crew is aware of the identified potential flight plan change options for cost recovery purposes. Here, the process 400 determines that the actual flight costs incurred thus far during the flight are greater than an acceptable cost range for this particular flight, triggering an analysis of the flight plan and the identification of potential modifications to the flight plan to recover at least a portion of the identified actual cost. In other words, the flight plan change options (i.e., the modifications to the flight plan) cost less than the actual cost of executing the current flight plan as-is and without changes. Flight cost recovery is a way to recoup some of the actual cost of the flight by modifying the current flight plan to incorporate lower-cost alternative options to continue the flight from the original departure location to the original arrival location.

Figure 5:
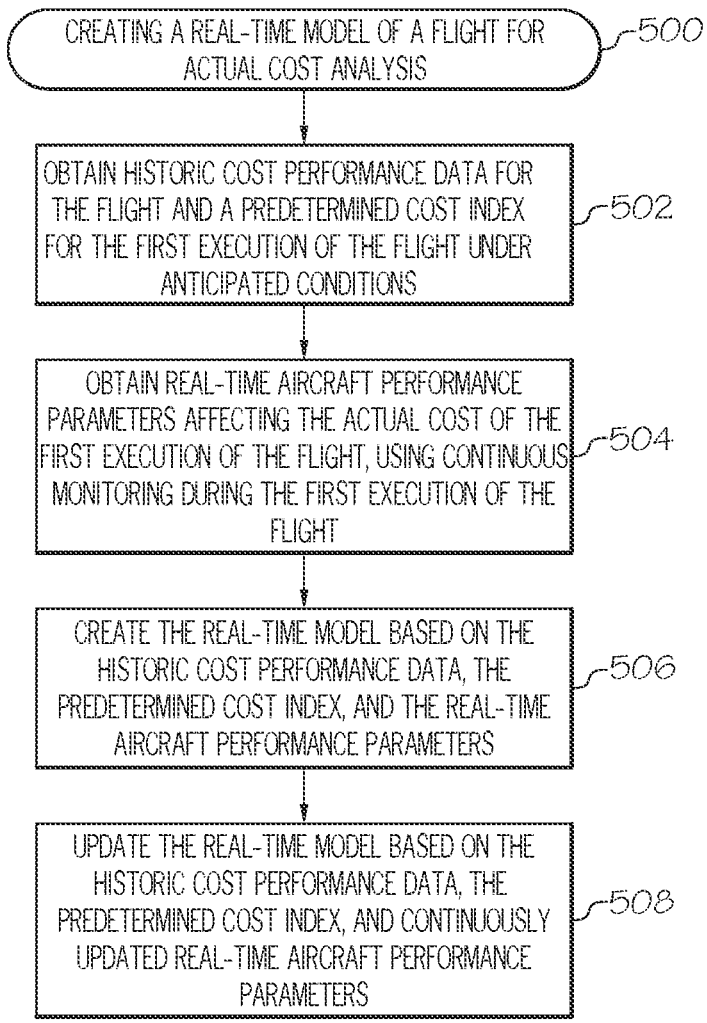
FIG. 5 is a flow chart that illustrates an embodiment of a process for creating a real-time model of a flight for actual cost analysis, in accordance with the disclosed embodiments.

FIG. 5 is a flow chart that illustrates an embodiment of a process 500 for creating a real-time model of a flight for actual cost analysis, in accordance with the disclosed embodiments. It should be appreciated that the process 500 described in FIG. 5 represents one embodiment of step 702 described below in the discussion of FIG. 7, including additional detail. It should also be noted that the process 500 is relevant to the description of step 602 described below in the discussion of FIG. 6, and includes additional relevant detail. First, the process 500 obtains historical cost performance data for the flight and a predetermined cost index for the first execution of the flight under anticipated conditions (step 502). The flight is an aircraft-based trip from an origin or departure location to a destination or arrival location, and historical cost performance data includes cost data for a plurality of executions of the flight from the origin to the destination. Cost target data includes the anticipated cost of the flight from the origin point (i.e., departure location) to a destination point (i.e., arrival location). The anticipated cost of the flight (i.e., the predetermined cost index) is based on the historical flight performance data, and was described previously with regard to FIG. 3, reference 310. Anticipated conditions affecting a projected cost of a flight may include weather conditions, wind conditions, pressure conditions, a physical condition of the aircraft, anticipated total aircraft weight, and any other quantifiable condition affecting flight performance of the aircraft and, as a result, affecting the cost of executing a particular flight.

The process 500 also obtains real-time aircraft performance parameters affecting the actual cost of the first execution of the flight, using continuous monitoring during the first execution of the flight (step 504). The real-time aircraft performance parameters may include, without limitation: aircraft speed modes used during the first execution, aircraft flight level changes implemented during the first execution, tactical interventions performed during the first execution, weather impact for the first execution, descent timing deviations during the first execution, and/or any other factor, parameter, or condition occurring internally to the aircraft or externally to the aircraft, which may affect an actual cost of executing the flight.

The process 500 then creates the real-time model based on the historic cost performance data, the predetermined cost index, and the real-time aircraft performance parameters (step 506). Here, the process 500 builds a software representation of the flight and provides the built software representation of the flight with input data including historic cost performance data and real-time aircraft performance parameters. The historic cost performance data includes applicable historic aircraft performance parameters and conditions of the flight, which generated the historic cost data. The process 500 analyzes the input historic aircraft cost performance parameters and the resulting actual cost of the historical flights. The process 500 also analyzes the input current real-time aircraft performance parameters and current real-time flight conditions for the current flight, and uses the historic aircraft parameters, historic flight conditions, and the resulting historic flight costs, to intelligently predict anticipated costs for the current flight. The real-time model may be implemented using well-known and commonly used techniques that need not be described here. It should be appreciated that the real-time model may be implemented using any appropriate computer software-based model for aircraft performance and flight cost data modeling and prediction, including but not limited to mathematical models, logical modeling, statistical modeling, or the like. Further, the real-time model may be stored, maintained, executed, and dynamically updated in real-time by an aircraft-integrated avionics device or a personal computing device (see reference 102 of FIG. 1; reference 200 of FIG. 2) via an Electronic Flight Bag (EFB) application.

The process 500 also updates the real-time model based on the historic cost performance data, the predetermined cost index, and continuously updated real-time aircraft performance parameters (step 508). Here again, the historic cost performance data includes historic aircraft performance parameters and conditions, historic flight conditions, and historic costs that resulted from the historic aircraft performance parameters, historic aircraft conditions, and historic flight conditions. The predetermined cost index is the cost target for the current flight that has been predetermined for anticipated conditions of the flight, the particular type of aircraft, and the details of the flight plan. The aircraft performance parameters are continuously monitored during execution of the flight, and the software model is also continuously updated using the updated aircraft performance parameter data. Thus, the process 500 continuously generates and maintains a current, updated version of the software model for the flight, such that the current, updated version can be used to forecast a continuously updated predicted cost to complete the flight according to the current flight plan that is in use.

Figure 6:
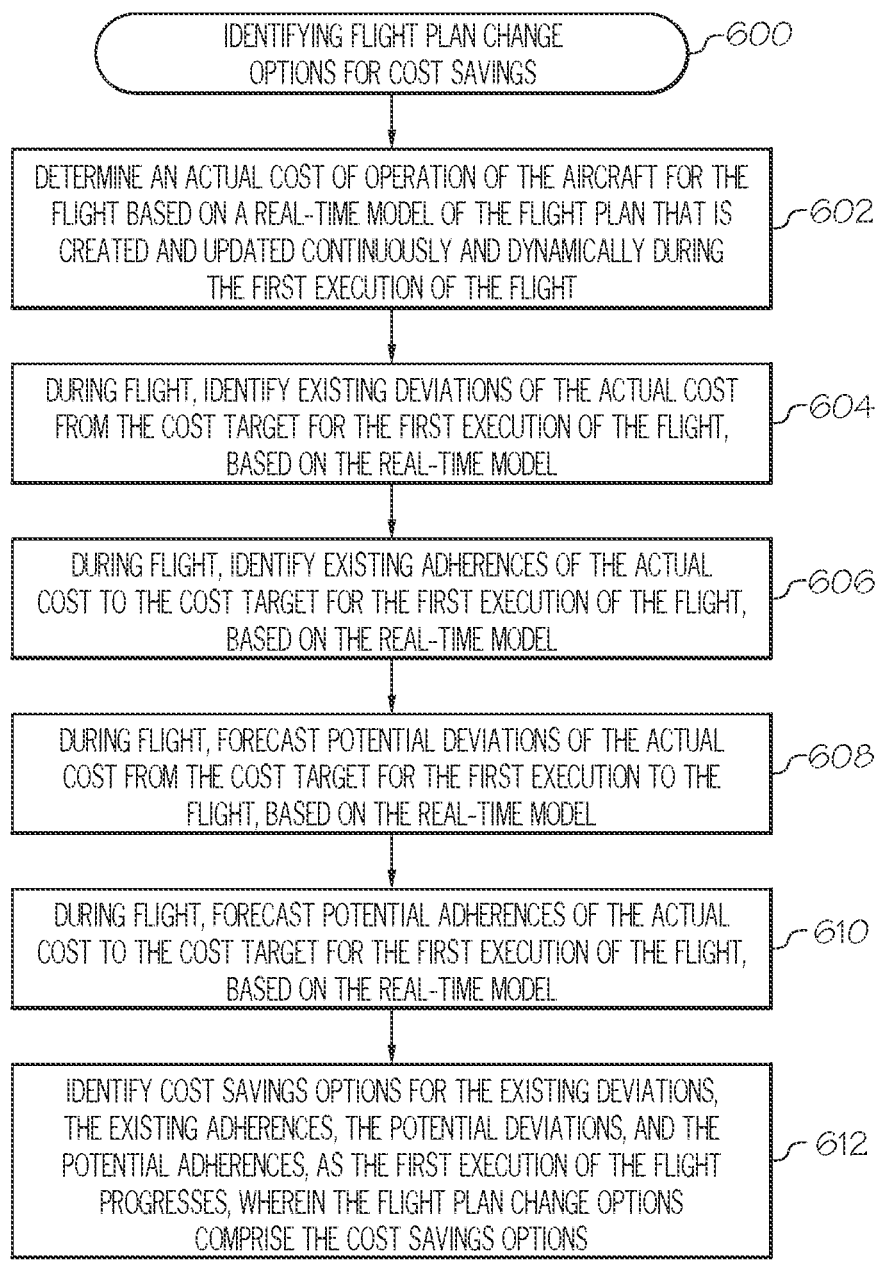
FIG. 6 is a flow chart that illustrates an embodiment of a process for identifying flight plan change options for cost savings, in accordance with the disclosed embodiments.

FIG. 6 is a flow chart that illustrates an embodiment of a process 600 for identifying flight plan change options for cost savings, in accordance with the disclosed embodiments. It should be appreciated that the process 600 described in FIG. 6 represents one embodiment of step 408 described above in the discussion of FIG. 4, including additional detail. First, the process 600 determines an actual cost of operation of the aircraft for the flight based on a real-time model of the flight (using details provided by the current flight plan) that is created and updated continuously and dynamically during the first execution of the flight (step 602). One suitable methodology for creating and updating a real-time model of the flight is described above with reference to FIG. 5. Here, the process 600 uses actual aircraft parameter data and actual aircraft conditions data for the current flight to compute the actual cost associated with performing the portions, segments, or subsets of the flight that have already been completed. In other words, the process 600 identifies a monetary value that has already been spent to execute the completed part of the flight.

During flight, the process 600 identifies existing deviations of the actual cost from the cost target for the first execution of the flight, based on the real-time model (step 604), and identifies existing adherences of the actual cost to the cost target for the first execution of the flight, based on the real-time model (step 606). As described herein, the process 600 uses the continuously updated software model to continuously monitor the actual cost of completed portions of the flight. Each completed part has an associated cost that has already been "spent" during completion of that particular part. Each completed part is also associated with a cost target, which is the anticipated cost of the flight from a beginning point to an ending point of the completed part. The cost target is generally a predetermined and realistic anticipated value that is based on historic cost data and current flight conditions. The cost target may be a cost estimate that is used as a goal or objective to be achieved during execution of the flight, in order to keep the flight costs within an acceptable range of costs for the flight. Here, when the actual cost for the completed part of the flight exceeds a cost target for the completed part of the flight or maintains cost values less than the cost target for the completed part of the flight, according to the continuously updated model, then the process 600 identifies a deviation from the cost target. The deviation from the cost target may be indicated by actual cost values greater than or less than the cost target. Additionally, when the actual cost for the completed part of the flight meets, maintains, coincides, matches, or otherwise corresponds to the cost target for the completed part of the flight, according to the continuously updated model, then the process 600 identifies an adherence to the cost target. The adherence to the target is identified for the duration of the actual cost trajectory that matches or corresponds to the cost target.

Also during the flight, the process 600 forecasts potential deviations of the actual cost from the cost target for the first execution of the flight, based on the real-time model (step 608) and forecasts potential adherences of the actual cost to the cost target for the first execution of the flight (step 610). Similar to the procedure described in steps 604 and 606, the process 600 uses the continuously updated model to predict the actual cost of completing a remainder of the flight according to the current flight plan and under current conditions (e.g., current aircraft performance parameters, current aircraft conditions, current flight conditions). Here, the process 600 predicts actual costs for future parts of the planned flight that have not yet been completed, and compares the predicted actual costs to cost targets applicable to the parts that have not yet been completed, to determine whether the current execution of the flight is on track to achieve the cost targets. When the predicted cost of future parts of the flight that have not yet been flown during the execution of the flight are greater than or less than the cost target for the future parts of the flight, then the process 600 forecasts a deviation for that particular part of the flight. A cost deviation is any predicted actual cost outside of an acceptable range of flight costs (as defined by the cost target) associated with an entire execution of a flight, or associated with a subset or part of the planned execution of the flight (step 608). Additionally, when the predicted cost of future parts of the flight that have not yet been flown during the execution of the flight match or coincide with the cost target for the future parts of the flight, then the process 600 forecasts an adherence for that particular part of the flight (step 610).

The process 600 also identifies cost savings options for the existing deviations, the existing adherences, the potential deviations, and the potential adherences, as the first execution of the flight progresses, wherein the flight plan change options comprise the cost savings options (step 612). As described previously, the process 600 predicts cost deviations and cost adherences from known actual costs of completed parts of the flight that is currently in progress, and from predicted actual costs of future, not yet completed parts of the flight that is currently in progress, wherein the cost deviations exceed or maintains actual cost values less than cost targets for corresponding parts of the flight, and wherein the cost adherences match, overlap, or otherwise coincide with cost targets for corresponding parts of the flight. Cost recovery options include potential modifications to the flight plan to reduce the predicted actual costs for the future, not yet completed parts of the flight, in order to retain, save, or avoid incurring some of the actual costs that exceeded cost targets for completed parts of the flight. In other words, early parts of the flight cost more to execute than planned or predicted via the cost targets, and later parts of the flight can be changed in order to cost less. Thus, using this strategy, the process 600 can reduce an actual cost for the entire flight, to keep the actual cost for the entire flight within a cost target for the entire flight.

Figure 7:
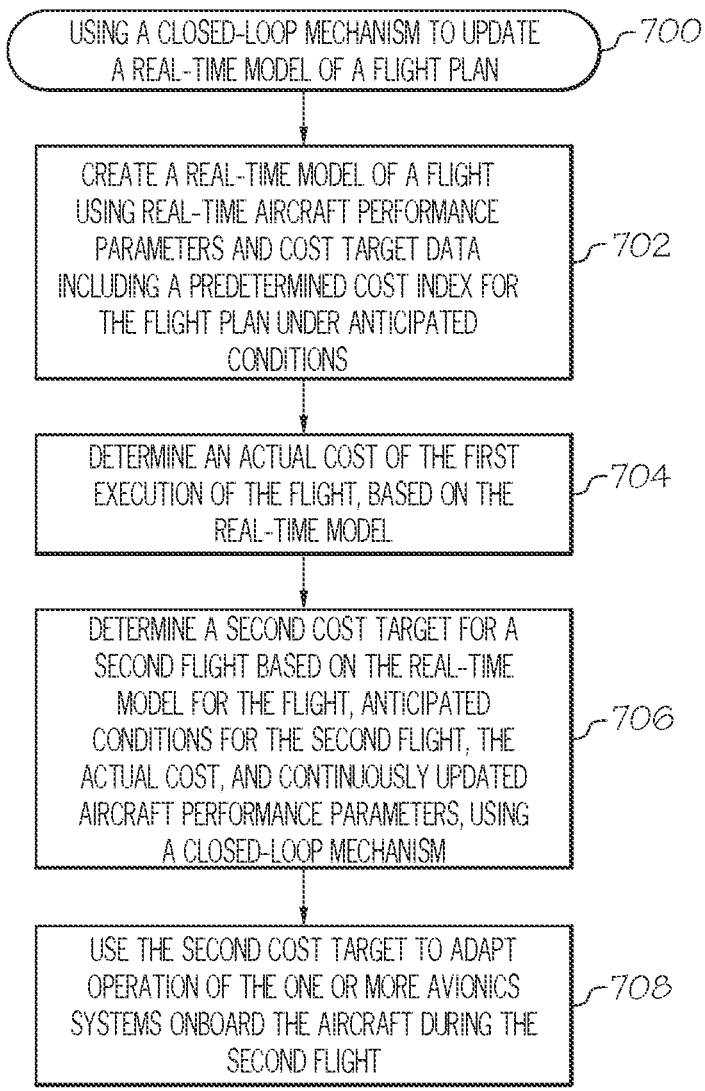
FIG. 7 is a flow chart that illustrates an embodiment of a process for using a closed-loop mechanism to update a real-time model of a flight, in accordance with the disclosed embodiments.

FIG. 7 is a flow chart that illustrates an embodiment of a process 700 for using a closed-loop mechanism to update a real-time model of a flight, in accordance with the disclosed embodiments. First, the process 700 creates a real-time model of a flight using real-time aircraft performance parameters and cost target data including a predetermined cost index for a first execution of the flight under anticipated conditions (step 702). One exemplary embodiment for creating a real-time model of a flight for actual cost analysis is described previously with regard to FIG. 5, including additional detail. An exemplary embodiment for creating and updating the real-time model is also described previously with regard to FIG. 6, including additional detail. The embodiments described with regard to FIGS. 5-6 are applicable for purposes of the process 700. The process 700 then determines an actual cost of the first execution of the flight, based on the real-time model (step 704). Exemplary embodiments for determining the actual cost using the real-time model are also described previously with regard to FIGS. 4 and 6, including additional detail, and the embodiments described with regards to FIGS. 4 and 6 are applicable for purposes of the process 700.

The process 700 then determines a second cost target for a second execution of the flight based on the real-time model for the flight, anticipated conditions for the second execution of the flight, the actual cost of the first execution of the flight, and continuously updated aircraft performance parameters, using a closed-loop mechanism (step 706). Here, the process 700 has already performed an analysis to determine costs associated with a first execution of a flight, compared the actual cost of the first execution to one or more cost targets for the first execution of the flight, provided cost savings options (i.e., flight plan change options) to retain, save, or avoid incurring some of the actual costs of the flight, and adapted the operations of avionics systems onboard the aircraft to accommodate an applicable cost savings option (see FIG. 4, process 400). Step 706 is performed after the process 400 of FIG. 4, and is used to perform analysis associated with a second intended execution for the same flight that begins at the same origin location and ends at the same destination location. The actual cost data and other actual parameter data, actual aircraft condition data, and actual flight condition data associated with the first execution of the flight has been used to update the software model for determining predicted costs and applicable cost savings and/or cost recovery options for the flight, as described with regard to FIG. 4. Thus, the software model includes updated historical data for the flight, and can be used to analyze the flight using updated data for purposes of making the most accurate and up-to-date predictions possible.

The second cost target is determined by the process 700 using the historical cost data of the real-time model. The second cost target may include an overall cost target that is associated with execution of the entire flight from origin to destination, or may include more than one cost target associated with subsets or parts of the flight. The process 700 uses a closed-loop feedback mechanism to generate predictions for subsequent executions of a particular flight. The closed-loop mechanism is a software-based feedback loop, wherein the output of the system (e.g., the software model) is "fed back" into the system and used as an input value to the system. As described herein, the software model is created and updated using historical cost performance data, and the "output" of the software model is the historical cost performance data generated and obtained during the first execution of the flight. Here, the process 700 determines one or more applicable cost targets for the second execution of the flight, using the feedback data (e.g., the historical cost performance data) that was previously generated during the first execution of the flight.

The process 700 then uses the second cost target to adapt operation of the one or more avionics systems onboard the aircraft during the second flight (step 708). During the second execution of the flight, the process 700 continuously and dynamically updates the software model using real-time aircraft performance parameters, in the same manner described with regard to process 500 of FIG. 5. The continuously updated software model is used to continuously update the actual cost of the second execution of the flight, which is compared to the determined cost target to identify cost deviations and cost adherences.

As described previously with regard to FIG. 4, cost savings options (i.e., flight plan change options, modifications to the flight plan) are also identified for purposes of saving some of the actual costs of the flight. Here, the process 700 uses the second cost target to perform analysis during the second execution of the flight, and adapts operation of the aircraft onboard avionics for any identified cost savings options. Additionally, as described previously with regard to FIG. 4, when cost deviations are identified, cost recovery options (i.e., flight plan change options, modifications to the flight plan) are also identified for purposes of recouping the monetary loss associated with the cost deviations. Here, the process 700 uses the second cost target to perform analysis during the second execution of the flight, and adapts operation of the aircraft onboard avionics for any identified cost recovery options.

Figure 8:
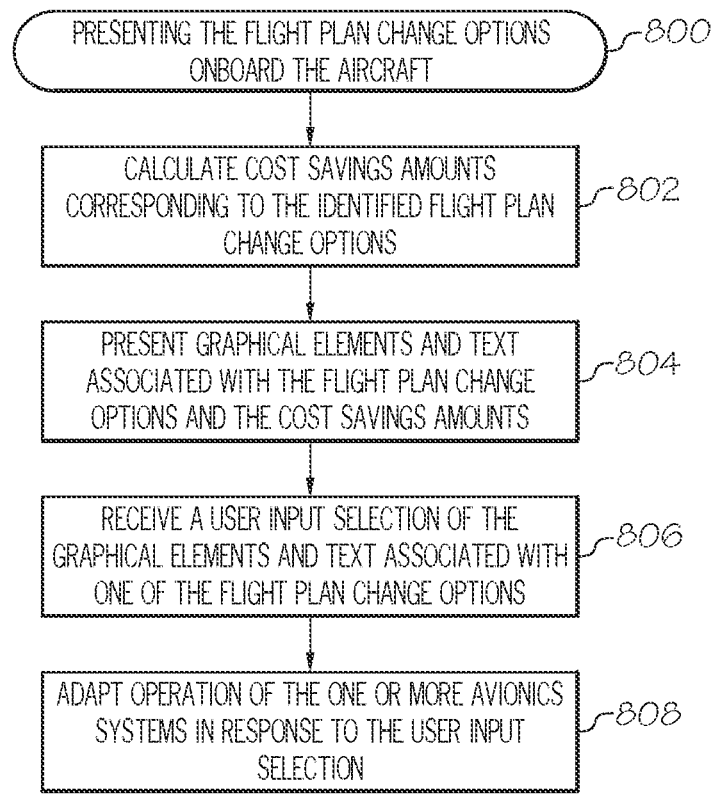
FIG. 8 is a flow chart that illustrates an embodiment of a process 800 for presenting flight plan change options onboard the aircraft, in accordance with the disclosed embodiments.

FIG. 8 is a flow chart that illustrates an embodiment of a process 800 for presenting flight plan change options onboard the aircraft, in accordance with the disclosed embodiments. It should be appreciated that the process 800 described in FIG. 8 represents one embodiment of step 410 described above in the discussion of FIG. 4, including additional detail. First, the process 800 calculates cost recovery amounts corresponding to the identified flight plan change options (step 802). As described herein, each of the flight plan change options is a modification to the flight plan that maintains the integrity of the flight by continuing progression of the flight from the original departure location to the originally-planned arrival location. Flight plan change options are identified in an effort to reduce the actual cost of executing the flight, and each flight plan change option is associated with a cost savings amount and/or a cost recovery amount. The cost savings amount is a monetary amount that can be saved by modifying the current flight plan to include the modification described by the flight plan change option. A cost recovery amount is a cost savings amount that is used to recoup some of the actual costs of the flight when the actual cost exceeds the predetermined cost targets for the flight. Thus, a cost savings is any monetary amount that can be saved, retained, or otherwise not incurred during the course of the flight. In other words, a cost savings amount is any cost reduction in the actual cost of the flight. A cost recovery amount is a particular type of cost savings amount obtained for purposes of recovering a monetary amount exceeding the cost target and that has already been spent during the course of the flight. In the case of cost recovery, the flight has become too expensive and the flight plan must be changed (using a flight plan change option) to recoup some of the already-spent monetary amount.

The process 800 presents graphical elements and text associated with the flight plan change options and the cost savings amounts (step 804). Here, the process 800 displays the available flight plan change options and corresponding cost savings amounts to inform the flight crew of the options to potentially reduce costs by changing the flight plan. The information for the flight crew includes context provided by including the cost savings amounts, such that the flight crew may choose how much cost savings the flight crew would prefer to obtain, by selecting a flight plan change option associated with the flight crew's preferred cost savings amount. The process 800 then receives a user input selection of the graphical elements and text associated with one of the flight plan change options (step 806) that has been selected by the flight crew, and adapts operation of the one or more avionics systems in response to the user input selection (step 808), as described previously with regard to step 416 of FIG. 4.

The various tasks performed in connection with processes 400-800 may be performed by software, hardware, firmware, or any combination thereof. For illustrative purposes, the preceding descriptions of processes 400-800 may refer to elements mentioned above in connection with FIGS. 1-3. In practice, portions of processes 400-800 may be performed by different elements of the described system. It should be appreciated that processes 400-800 may include any number of additional or alternative tasks, the tasks shown in FIGS. 4-8 need not be performed in the illustrated order, and processes 400-800 may be incorporated into a more comprehensive procedure or process having additional functionality not described in detail herein. Moreover, one or more of the tasks shown in FIGS. 4-8 could be omitted from embodiments of the processes 400-800 as long as the intended overall functionality remains intact.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

The following description refers to elements or nodes or features being "connected" or "coupled" together. As used herein, unless expressly stated otherwise, "coupled" means that one element/node/feature is directly or indirectly joined to (or directly or indirectly communicates with) another element/node/feature, and not necessarily mechanically. Likewise, unless expressly stated otherwise, "connected" means that one element/node/feature is directly joined to (or directly communicates with) another element/node/feature, and not necessarily mechanically. Thus, although the schematic shown in FIG. 2 depicts one exemplary arrangement of elements, additional intervening elements, devices, features, or components may be present in an embodiment of the depicted subject matter.

For the sake of brevity, conventional techniques related to signal processing, data transmission, signaling, network control, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Some of the functional units described in this specification have been referred to as "modules" in order to more particularly emphasize their implementation independence. For example, functionality referred to herein as a module may be implemented wholly, or partially, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like. Modules may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together, but may comprise disparate instructions stored in different locations that, when joined logically together, comprise the module and achieve the stated purpose for the module. Indeed, a module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set, or may be distributed over different locations including over different storage devices, and may exist, at least partially, merely as electronic signals on a system or network.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A system, comprising:
a memory;
at least one processor communicatively coupled to the memory, the at least one processor configured to:
determine an actual cost of operation of an aircraft for a flight associated with a flight plan based on at least one aircraft performance parameter monitored during a course of a flight, wherein the at least one aircraft performance parameter affects the actual cost for a completed portion of the flight;
identify at least one of: a current deviation and a current adherence of the actual cost from a target cost for the flight;
forecast at least one of: a future deviation and a future adherence of the actual cost from the target cost based on at least one of: the current deviation and the current adherence identified for the flight;

determine a plurality of options to change the flight plan, wherein the plurality of options are associated with cost savings for the at least one of the current deviation and the current adherence and for the at least one of the future deviation and the future adherence as the flight progresses, wherein the plurality of options to change the flight plan include potential modifications to the flight plan to complete the flight; and generate instructions to adapt operation of one or more avionics systems onboard the aircraft, based on one of the plurality of options to change the flight plan.

2. The system of claim 1, wherein the at least one processor is further configured to:

continuously monitor the at least one aircraft performance parameter for completed portions of the flight; and update the actual cost based on the monitored at least one aircraft performance parameter for the completed portions of the flight.

3. The system of claim 1, wherein the target cost is a predetermined anticipated value based on historic cost data and current flight conditions.

4. The system of claim 1, wherein the current deviations are identified based on at least one of: the actual cost being greater than or less than the target cost or the actual cost being outside of a predetermined range of the target cost.

5. The system of claim 1, wherein the at least one processor is further configured to:

display the plurality of options to change the flight plan on a user interface onboard the aircraft;

receive a selection, through the user interface, of one of the plurality of options to change the flight plan; and transmit the selection of the one of the plurality of options to change the flight plan to one or more avionics systems onboard the aircraft.

6. The system of claim 1, wherein the current adherences are identified based on the actual cost substantially matching the target cost.

7. The system of claim 1, wherein the future deviations and future adherences of the actual cost from the cost target are forecasted based on the actual cost of completing a remainder of the flight under current conditions.

8. The system of claim 1, wherein the cost savings include at least one of: potential modifications to the flight plan to reduce the actual cost for the future portions of the flight plan or potential modifications to the flight plan such that the actual cost is within the target cost for the flight.

9. The system of claim 1, wherein the at least one aircraft performance parameter includes at least one of aircraft speed modes used during the flight, aircraft flight level changes implemented during the flight, tactical interventions performed during the flight, weather impact for the flight, or descent timing deviations during the flight.

10. A method, comprising:

determining an actual cost of operation of an aircraft for a flight associated with a flight plan based on at least one aircraft performance parameter monitored during a course of a flight, wherein the at least one aircraft performance parameter affects the actual cost for a completed portion of the flight;

identifying at least one of: a current deviation and a current adherence of the actual cost from a target cost for the flight;

forecasting at least one of: a future deviation and a future adherence of the actual cost from the target cost based on at least one of: the current deviation and the current adherence identified for the flight;

determining a plurality of options to change the flight plan, wherein the plurality of options are associated with cost savings for the at least one of the current deviation and the current adherence and for the at least one of the future deviation and the future adherence as the flight progresses, wherein the plurality of options to change the flight plan include potential modifications to the flight plan to complete the flight; and generating instructions to adapt operation of one or more avionics systems onboard the aircraft, based on one of the plurality of options to change the flight plan.

11. The method of claim 10, further comprising:

continuously monitoring the at least one aircraft performance parameter for completed portions of the flight; and updating the actual cost based on the monitored at least one aircraft performance parameter for the completed portions of the flight.

12. The method of claim 10, wherein the target cost is a predetermined anticipated value based on historic cost data and current flight conditions.

13. The method of claim 10, wherein the current deviations are identified based on at least one of: the actual cost being greater than or less than the target cost or the actual cost being outside of a predetermined range of the target cost.

14. The method of claim 10, further comprising:

displaying the plurality of options to change the flight plan on a user interface onboard the aircraft;

receiving a selection, through the user interface, of one of the plurality of options to change the flight plan; and transmitting the selection of the one of the plurality of options to change the flight plan to one or more avionics systems onboard the aircraft.

15. The method of claim 10, wherein the current adherences are identified based on the actual cost substantially matching the target cost.

16. The method of claim 10, wherein the future deviations and future adherences of the actual cost from the cost target are forecasted based on the actual cost of completing a remainder of the flight under current conditions.

17. The method of claim 10, wherein the cost savings include at least one of: potential modifications to the flight plan to reduce the actual cost for the future portions of the flight plan or potential modifications to the flight plan such that the actual cost is within the target cost for the flight.

18. The method of claim 10, wherein the at least one aircraft performance parameter includes at least one of aircraft speed modes used during the flight, aircraft flight level changes implemented during the flight, tactical interventions performed during the flight, weather impact for the flight, or descent timing deviations during the flight.

19. A system, comprising:

a memory;

at least one processor communicatively coupled to the memory, the at least one processor configured to:

determine an actual cost of operation of an aircraft for a flight associated with a flight plan based on at least one aircraft performance parameter monitored during a course of a flight, wherein the at least one aircraft performance parameter affects the actual cost for a completed portion of the flight;

identify at least one of: a current deviation and a current adherence of the actual cost from a target cost for the flight, the current deviation being based on the actual cost being outside of a predetermined range of the target cost and the current adherence being based on the actual cost substantially matching the target cost, wherein the target cost is a predetermined anticipated value based on historic cost data and current flight conditions;

forecast at least one of: a future deviation and a future adherence of the actual cost from the Gest target cost based on at least one of: the current deviation and the current adherence identified for the flight based on the actual cost of completing a remainder of the flight under current conditions;

determine a plurality of options to change the flight plan associated with cost savings for the at least one of the current deviation and the current adherence and for the at least one of the future deviation and the future adherence as the flight progresses, wherein the plurality of options to change the flight plan include potential modifications to the flight plan to complete the flight; and generate instructions to adapt operation of one or more avionics systems onboard the aircraft, based on one of the plurality of options to change the flight plan.

20. The system of claim 19, wherein the at least one processor is further configured to:

display the plurality of options to change the flight plan on a user interface onboard the aircraft;

receive a selection, through the user interface, of one of the plurality of options to change the flight plan; and transmit the selection of the one of the plurality of options to change the flight plan to one or more avionics systems onboard the aircraft.

* * * * *